United States Patent
Dins et al.

(10) Patent No.: US 7,244,096 B2
(45) Date of Patent: Jul. 17, 2007

(54) CURVED BLADE OIL SCOOP

(75) Inventors: Jonathan E. Dins, Tucson, AZ (US); John Hogan, Gilbert, AZ (US); Arun Kumar, Chandler, AZ (US)

(73) Assignee: Honeywell International, Inc., Morristown, NJ (US)

( * ) Notice: Subject to any disclaimer, the term of this patent is extended or adjusted under 35 U.S.C. 154(b) by 118 days.

(21) Appl. No.: 11/133,715

(22) Filed: May 19, 2005

(65) Prior Publication Data

US 2006/0263202 A1    Nov. 23, 2006

(51) Int. Cl.
    *F04D 1/12*    (2006.01)
(52) U.S. Cl. .......................................... 415/88; 415/92
(58) Field of Classification Search .................. 415/88, 415/92, 110, 111
    See application file for complete search history.

(56) References Cited

U.S. PATENT DOCUMENTS

| | | |
|---|---|---|
| 2,124,914 A | 7/1938 | Fottinger |
| 3,646,756 A | 3/1972 | Langlois |
| 4,047,847 A | 9/1977 | Oikawa |
| 4,339,923 A | 7/1982 | Hays et al. |
| 4,453,784 A | 6/1984 | Kildea et al. |
| 4,468,066 A | 8/1984 | Alcorta et al. |
| 4,648,485 A * | 3/1987 | Kovaleski .................. 184/13.1 |
| 5,489,190 A | 2/1996 | Sullivan |
| 5,609,073 A | 3/1997 | Spooner et al. |
| 6,409,464 B1 * | 6/2002 | Fisher et al. .................... 415/1 |
| 6,682,222 B2 | 1/2004 | Fisher |

* cited by examiner

*Primary Examiner*—Edward K. Look
*Assistant Examiner*—Devin Hanan
(74) *Attorney, Agent, or Firm*—Ingrassia Fisher & Lorenz

(57) ABSTRACT

Disclosed herein is a rotating radial scoop used to move fluid from a larger radius to a smaller radius, comprising a blade at least partially circumscribing a central axis from an outer radius of the scoop to an capture radius of the scoop, wherein the inner surface of the blade is curved. A scoop having a blade with a curved inner surface extending from the scoop outer radius to a capture radius is disclosed. A turbine engine comprising the scoop, along with a method of providing a fluid to a bearing utilizing the scoop is also disclosed.

34 Claims, 6 Drawing Sheets

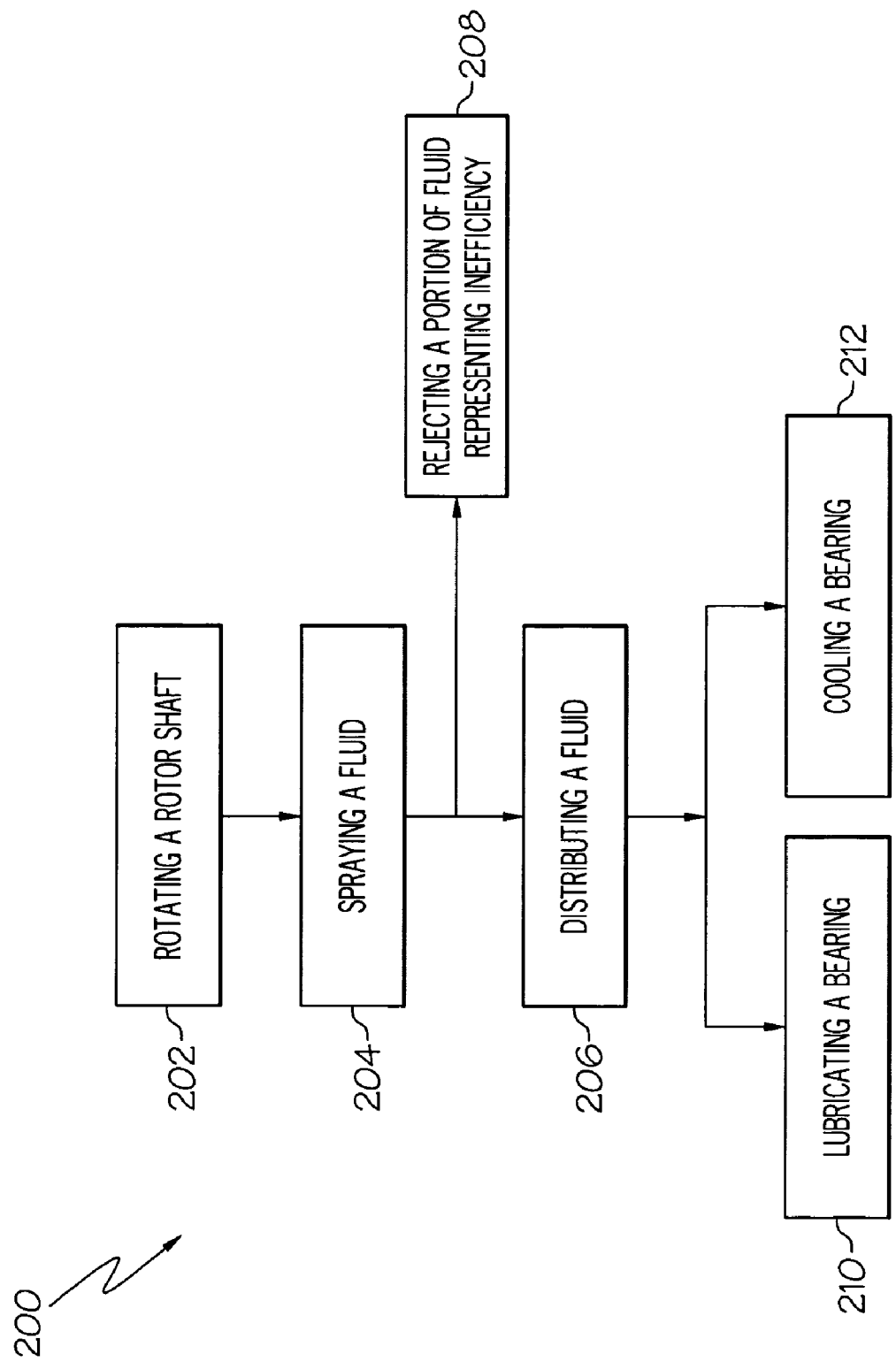

CURVED BLADE OIL SCOOP

GOVERNMENT RIGHTS

This invention was made with Government support under contract number DAAH10-03-2-0007 awarded by the U.S. Army AATD. The Government has certain rights in this invention.

BACKGROUND OF THE INVENTION

The present invention generally relates to apparatus and methods for capturing lubrication fluid in a turbine engine and, more specifically, to apparatus and methods of capturing fluid from a fluid nozzle with a scoop rotating about a central axis.

Turbine engines and other machinery having components that rotate at several thousand revolutions per minute have bearing assemblies that support rotating shafts. Higher cycle temperatures and air temperatures within these engines may result in temperature increases in the rotor and bearings. As such equipment grows in size, larger bearings may be included within such equipment to provide increased support and performance for turbine engines and other such equipment.

To minimize the effects of increased temperatures, friction, and the like, which may occur in a turbine engine, bearing assemblies include lubrication systems that provide lubricant to the bearing assemblies supporting rotor shafts, which may in turn reduce wear to the bearing assemblies and which may provide cooling to the bearing assemblies. A typical bearing assembly may include a split inner ring mounted to a rotor shaft, an outer ring, and a rolling element supported therebetween. The lubrication system may include an oil jet to supply oil to a shaft having a plurality of axial grooves in the shaft for supplying oil to the bearing assembly.

In such lubrication systems, the oil is transferred from a stationary location to a rotating shaft. One method to do this is to use a radially rotating scoop in combination with a jet that sprays the oil at a rotating scoop. The scoop may have a plurality of blades that captures at least a portion of the oil being sprayed from the jet. The captured oil may then be directed to a plurality of axial slots disposed in the rotating shaft, which eventually terminate in a location to provide the captured fluid to the bearing.

For example, U.S. Pat. No. 6,409,464 ("Fisher 464") is directed to a method of supplying oil to bearings which includes supplying oil through a plurality of scoops to a rotor shaft groove through at least one opening that extends between the rotor shaft inner and outer surfaces of the scoops. The rotor shaft includes a plurality of scoops extending between the rotor shaft inner and outer surfaces. However, the scoops disclosed are conventional flat blade scoops that merely extend between rotor shaft outer and inner surfaces. This reference does not recite particular scoop geometries which maximizes the capture and distribution of oil.

U.S. Pat. No. 6,682,222 ("Fisher 222") is directed to a bi-directional oil scoop for bearing lubrication. Fisher 222 discloses a scoop having a constriction over which the oil sprayed from a jet into the scoop must pass. The constriction acts as a potential barrier for the oil. The portion of the scoop radially past the constriction is arranged to be downstream of the constriction in a centrifugal sense. This constriction thus prevents oil from flowing back towards the jet once it has passed this constriction. However, similar to "Fisher 464" above, this reference discloses conventional flat blade oil scoops which protrude tangentially from the shaft inner surface to the shaft outer surface. This reference does not recite a particular scoop geometry that maximizes the capture and distribution of oil.

Radial oil scoops known in the art are not 100% efficient, and the efficiency can depend on shaft speeds. Low efficiency oil scoops may thus result in extra oil inside bearing sumps of the engine, which may decrease engine efficiency by wasting power due to oil churning. To produce the extra flow of fluid from the jet to compensate for the inefficiency of oil scoops, the oil system components size and weight may be increased relative to the size required for the captured amount of fluid. This may also negatively impact power to weight ratio of the engine. As can be seen, there is a need for an improved apparatus and method to capture fluid using a high efficiency scoop rotating about a central axis, preferably a scoop which at a given shaft speed and fluid jet location and velocity has an increased efficiency relative to known flat blade scoops present in the art.

SUMMARY OF THE INVENTION

In one aspect of the present invention, a scoop comprises a blade at least partially circumscribing a central axis of the scoop from an outer radius of the scoop to a capture radius of the scoop, wherein the blade is curved.

In another aspect of the present invention, a scoop comprises a blade having an inner surface located between a central axis and a outer radius of the scoop, the blade inner surface at least partially circumscribing the central axis of the scoop from a scoop inlet to a scoop outlet, the scoop inlet located at the outer radius of the scoop, and said scoop outlet located at a capture radius of the scoop or a larger radius, wherein the inside surface of the blade is curved.

In yet another aspect of the present invention, a scoop comprises a blade at least partially circumscribing a central axis from a scoop inlet located at an outer radius, to a scoop outlet located at a capture radius, wherein the blade has an inside blade surface between the central axis and the outer radius, the blade having a blade curvature from the outer radius to a barrier located between the scoop inlet and the scoop outlet, wherein the barrier depends radially inward from the blade towards the central axis to define a capture radius; a capture cavity located circumferentially between the barrier and the scoop outlet, the capture cavity being bounded by the capture radius and by the inner surface of a capture arc, wherein the capture arc is between the capture radius and the outer radius of the scoop, wherein the blade curvature comprises a plurality of points P on the blade circumferentially between the scoop inlet and the barrier, and wherein the plurality of points P are defined by the equation:

$$\frac{\text{Point } P \text{ radius}}{\text{Capture radius}} = e^{\beta \tan \alpha}$$

wherein: $\alpha$ is an angle between a line tangent to said outer radius and said blade inner surface at the outer radius, $\beta$ is said angular distance of point P from said capture radius, and e is the exponential function.

In yet a further aspect of the present invention, a turbine engine comprises a rotor shaft supported by at least two bearings with or without a seal; a fluid nozzle for ejecting a fluid towards a scoop circumscribing the rotor shaft; wherein the scoop comprises a blade at least partially circumscribing a central axis of the rotor shaft from a first radial position an outer radius of the scoop to a second radial position at a capture radius of the scoop, wherein the blade is curved.

In yet a further aspect of the present invention, a method of providing a fluid to a bearing comprises the steps of rotating a shaft, the shaft supported by a bearings, and a scoop circumscribing the rotor shaft; spraying the fluid towards the scoop such that at least a portion of the fluid is captured by the scoop; distributing the fluid received by the scoop to the bearing(s) through a conduit disposed in the rotor shaft, the conduit extending axially from the scoop to the bearing(s) wherein the scoop comprises a blade at least partially circumscribing the central axis from an outer radius to an capture radius, wherein the blade is curved.

These and other features, aspects and advantages of the present invention will become better understood with reference to the following drawings, description and claims.

BRIEF DESCRIPTION OF THE DRAWINGS

FIG. 6 shows in block diagram form, the steps of a method of the present invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention generally provides a scoop comprising a curved blade 12 at least partially circumscribing a central axis 14. This is unlike the prior art wherein the scoop blade inner surface 60 is flat. In another embodiment, the present invention provides for a scoop having a blade curved to maximize fluid capture from a stationary fluid nozzle directed towards the scoop. This is also unlike the prior art wherein the flat blades are not dimensioned to maximize fluid capture. The present invention may be useful in turbine engines, and other such devices which have shafts rotating at several thousand revolutions per minute supported by bearings, which need to be lubricated.

Figure 1:
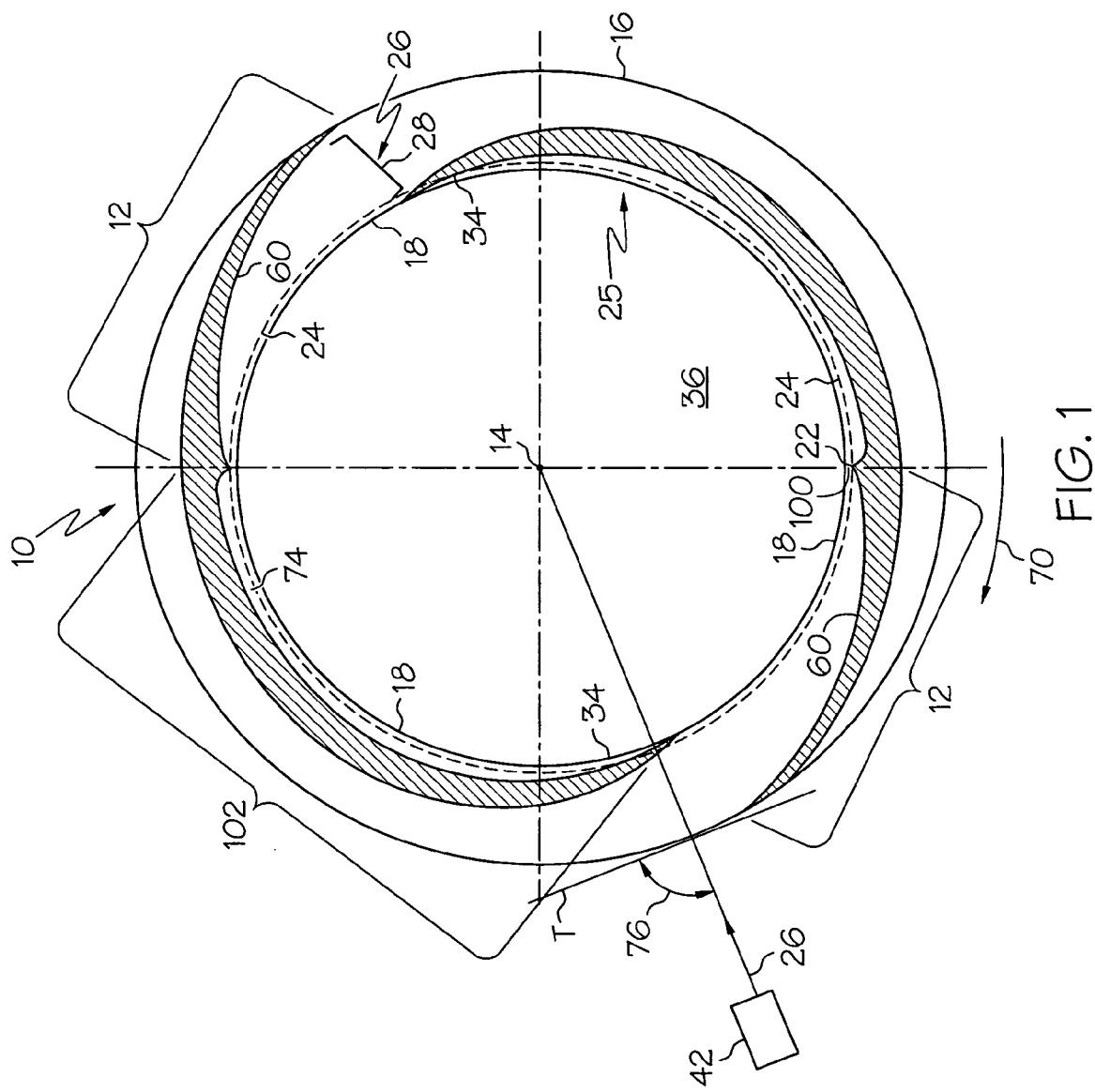
FIG. 1 shows a cross sectional view of a scoop of the present invention.

FIG. 1 depicts a scoop 10 comprising a blade 12 partially circumscribing a central axis 14 (located perpendicular to the plane of the figure). Blade 12 extends from an outer radius 16 of scoop 10 to a capture radius 24 of scoop 10. In the embodiment shown in FIG. 1, blade inner surface 60 may be curved from outer radius 16 to capture radius 24. Blade 12 may also comprise a barrier 22 which may extend radially inward from blade 12 towards central axis 14 to a capture radius 24, wherein capture radius 24 defines a location which is radially outward from shaft radius 18. Barrier 22 and capture radius 24 may be dimensioned and arranged to form a throat 100 through which fluid 26 entering scoop 10 can pass in order to enter capture cavity 74. Accordingly, scoop 10 may comprise barrier 22 located at downstream end 25 of the said blade between outer radius 16 and capture radius 24. Barrier 22 may depend radially inward from blade 10 towards central axis 14 to define capture radius 24.

The area within the inner surface 68 of capture arc 102 and the capture radius 24 defines capture cavity 74. Barrier 22 may be dimensioned and arranged to prevent fluid from flowing backwards from capture cavity 74 towards outer radius 16.

Blade 12 and capture arc 102 jointly define a scoop inlet 28 between outer radius 16 and shaft radius 18. The rotation of the scoop 10 drives the fluid in the capture cavity 74 towards distribution conduit 38.

In the embodiment shown in FIG. 1, scoop 10 may be disposed on a rotor shaft 36. Rotor shaft 36, which may include a component on the shaft adjacent to scoop 10 may include one or more conduits 38, located in proximity to scoop capture cavity 74 that provide fluid communication between capture cavity 74 and a bearing 46 (see FIG. 3) or rolling element cage 78 or any other component on the shaft to which fluid 26 may be directed. Fluid 26 may be directed at scoop 10 from a fluid nozzle 42 which may be positioned to direct fluid 26 towards scoop 10 at a spray angle 76, for example, between about 90° and −90°, wherein spray angle 76 may be determined relative to a line T tangent to outer radius 16. In an embodiment, scoop 10 may comprise one blade 12 (see FIG. 5b). In another embodiment, as shown in FIG. 1, scoop 10 may comprise a plurality of blades, e.g., two blades, three blades, or more.

Figure 2:
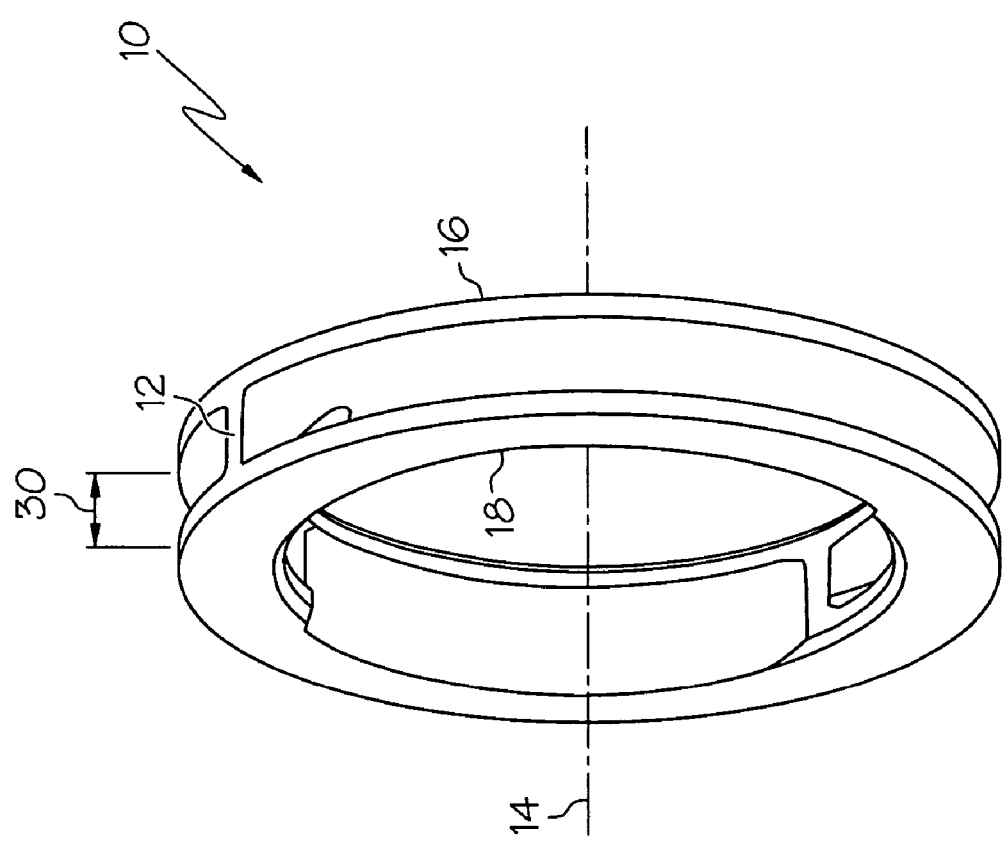
FIG. 2 shows a perspective view of the scoop shown in FIG. 1.

As shown in FIG. 2, blade 12 may have a blade width 30 indicated by a line that may be substantially parallel with central axis 14. In an embodiment, blade width 30 may be essentially parallel with central axis 14.

Figure 3:
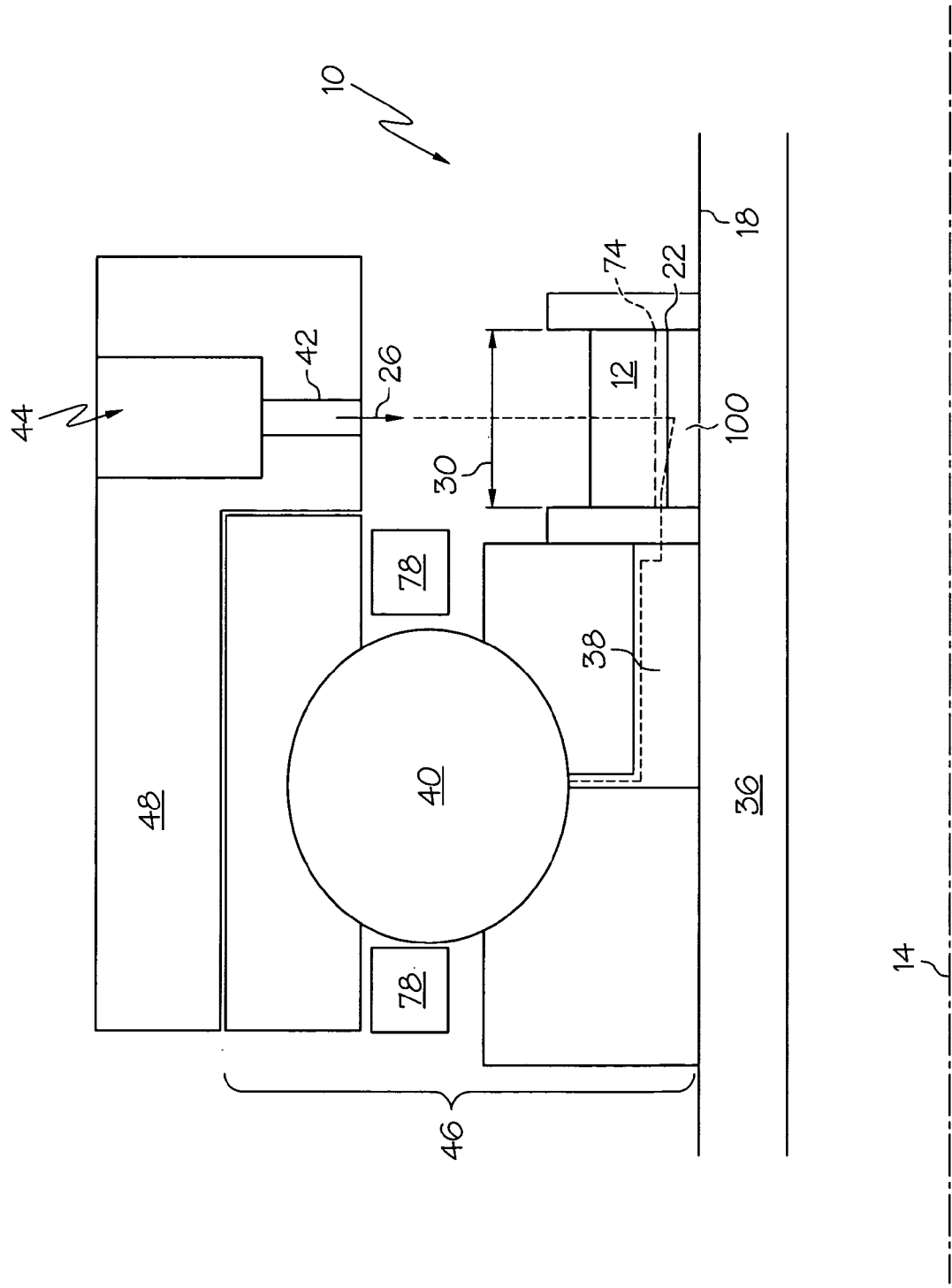
FIG. 3 shows a partial cross-sectional view of a scoop in proximity to a bearing, according to the present invention.

FIG. 3 shows an axial cross section along central axis 14, and depicts part of scoop 10 having a blade width 30. As shown in FIG. 3, fluid nozzle 42 (e.g., fluid jet, spray nozzle, or the like) may be positioned to direct a stream of fluid 26 from an oil supply 44. At least a portion of fluid 26 may be intercepted by scoop 10 at scoop inlet 28 located between blade 12 at outer radius 16 and shaft radius 18. Rotation of rotor shaft 36 produces a relative velocity which propels the fluid 26 inboard along the blade inner surface 60 from outer radius 16 through throat 100 past barrier 22. Centrifugal force of rotating rotor shaft 36 then propels fluid 26 into capture cavity 74 along the inner surface 68 of capture arc 102 and further to distribution conduit 38. For controlled flow distribution among various conduits 38, there may be a fluid reservoir between capture cavity 74 and various conduits 38. The conduits 38 may distribute the fluid 26 to various components of turbine engine 48. Fluid 26 may comprise a lubrication fluid such as an oil, a cooling fluid, or the like.

Figure 4:
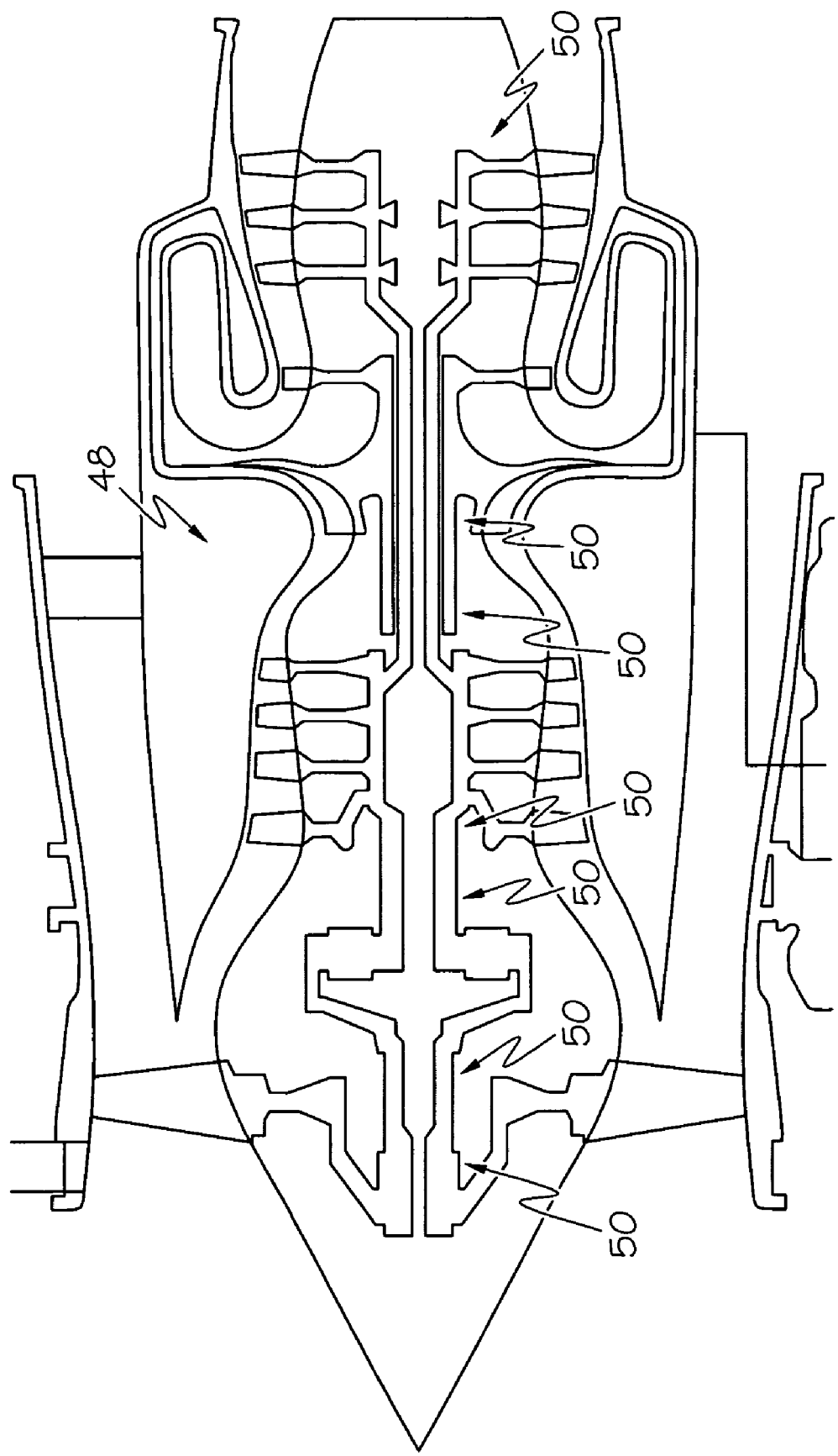
FIG. 4 shows a cross-section of a turbine engine detailing possible placement of the present invention.

FIG. 4 shows a cross section of turbine engine 48. The arrows indicate possible component locations 50 of a bearing assembly 46 as shown in FIG. 3, or other components, which may require lubrication or cooling wherein scoop 10 of the present invention may be located. Taking a turbine engine as an example, scoop 10 may be located in a compressor section, under the combustor, in a turbine section, or the like. Accordingly, a plurality of scoops 10 may be located in a single turbine engine 48.

Figures 5A, 5B:
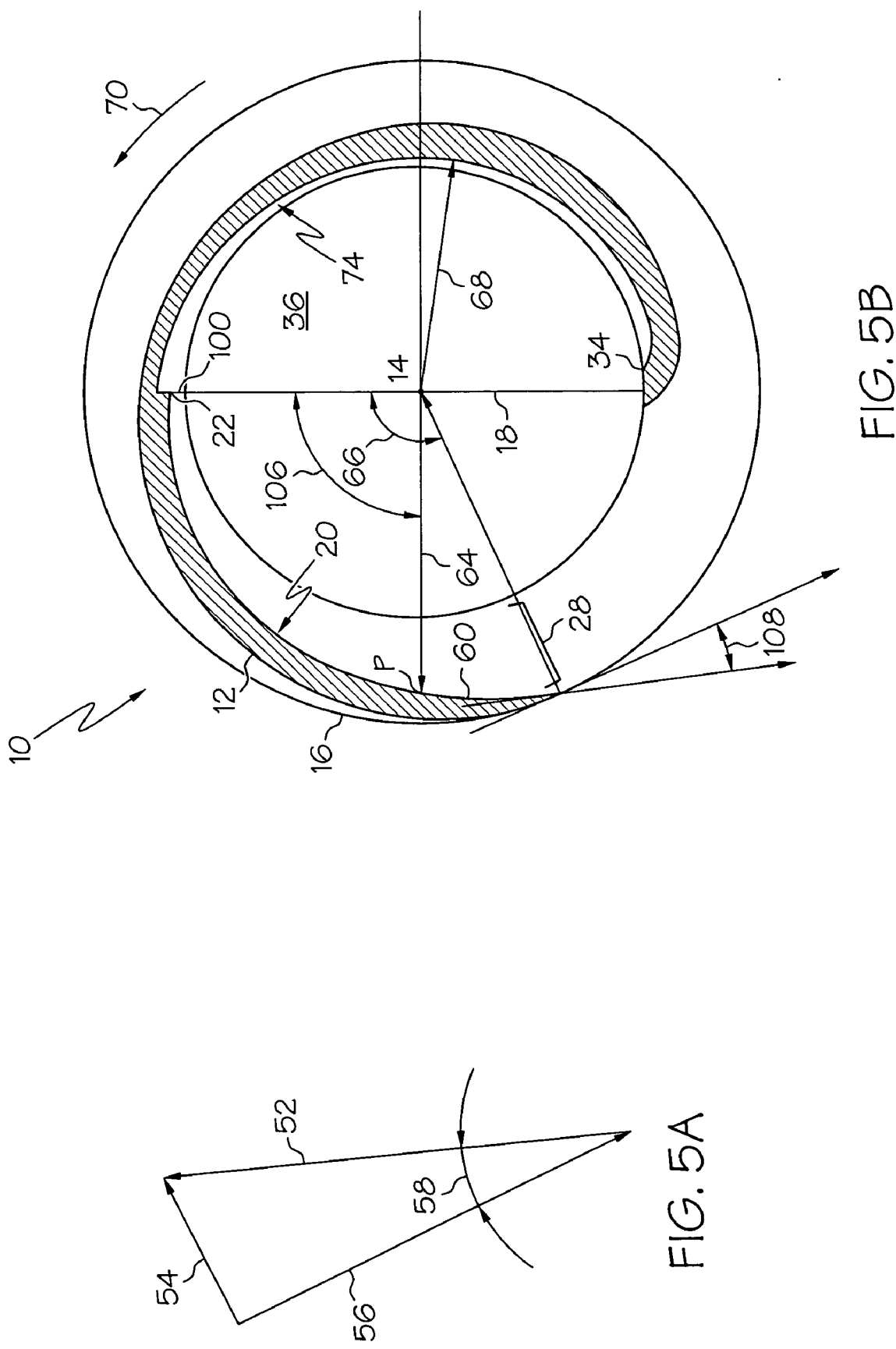
FIG. 5a shows a vector representation of the velocities of a fluid flow and a scoop of the present invention.
FIG. 5b shows a cross sectional view of the scoop of the present invention with a detailed view of an embodiment.

In an embodiment of the present invention shown in FIG. 5b, scoop 10 may have a direction of rotation 70 about central axis 14 which defines the blade velocity vector 56. Blade velocity vector 56 representing the velocity of the blade inner surface 60 at a particular radius (e.g., radius 16, radius 24, or at another radius of choice). As shown in vector representation in FIG. 5a, the fluid velocity relative to scoop 10, represented by relative velocity vector 52, is the vector sum of the velocity of fluid 26 from fluid nozzle 42, represented by fluid velocity vector 54, and the blade velocity vector 56. The impact angle 58 is the angle between blade velocity vector 56 and relative velocity vector 52 (FIG. 5a). Scoop capture efficiency may be maximized wherein the relative velocity vector 52 is essentially tangent to blade inner surface 60 at the point or points of contact between curved inner surface 60 and fluid 26. Shape of the curved inner surface 60 may be dimensioned in such a way so as to minimize energy loss as the fluid moves along the inner surface towards the capture radius 24.

In an embodiment, capture radius 24 may be defined as the radius at the point on barrier 22 that may be closest to central axis 14. In an embodiment, blade 12 may have a curved inner surface 60 over a portion of the length of blade 12 shown (FIG. 1), wherein inner surface 60 may extend from close to the outer radius 16 to barrier 22. To minimize loss of kinetic energy of fluid 26 being directed into scoop 10, blade inner surface 60 of blade 12 may comprise a plurality of points P (FIG. 5b) where in the curve defined by points P along blade inner surface 60, from scoop inlet 28 to barrier 22, may be a segment of a logarithmic spiral to allow for a uniform transition of fluid 26 from outer radius 16 to capture radius 24. In other alternative embodiments, points P along inner surface 60 may vary non-uniformly from outer radius 16 to barrier 22; points P in inner surface 60 may vary continuously from outer radius 16 to barrier 22; points P in inner surface 60 may vary non-continuously from outer radius 16 to barrier 22; points P in inner surface 60 may vary eccentrically from outer radius 16 to barrier 22; points P in inner surface 60 may vary exponentially from outer radius 16 to barrier 22. In other alternative embodiments, points P along inner surface 60 may vary on a radius with its center offset from center axis 14 from outer radius 16 to barrier 22 such that the points P form an arc that is a best fit approximation of a logarithmic spiral segment starting from outer radius 16 and ending at center axis 14.

In an embodiment, points P on inner surface 60 may be defined by equation 1:

$$\frac{\text{Point } P \text{ radius } 64}{\text{Capture radius } 24} = e^{\beta \tan \alpha} \qquad \text{Equaton 1}$$

wherein e is the exponential function, angle α (angle 108 in FIG. 5b) is the same as impact angle 58 (FIG. 5a) and angle β (represented in FIG. 5b by reference numeral 66) is the angle between barrier 22 and point P. For clarity, FIG. 5b shows only a single point P having a point P radius 64, however, point P may comprise an infinite number of points along inside blade surface 60 from scoop inlet 28 to barrier 22. Blade curvature 20 may thus be obtained by solving Equation 1 for different values of β starting from 0, and increasing till point P lies on outer radius 16. $\beta_{max}$ would then approximate the total angle subtended by inner surface 60, as is represented by reference numeral 106 in FIG. 5b.

In another embodiment, $\beta_{max}$ may be constrained to a certain range of values to obtain a desired size of capture arc 102. In such a case, for a given outer radius 16, and capture radius 24, Equation 1 may be solved for α.

Scoop 10 may further comprise a capture cavity 74 partially circumscribing central axis 14 between barrier 22 and end point 34. Capture cavity 74 may be bounded between capture radius 24 and inner surface of capture arc 68.

Inner surface of capture arc 68 may be centrifugally downhill of barrier 22 such that fluid 26 may be retained within capture cavity 74. In operation, scoop 10 can intercept fluid 26 being directed (e.g., sprayed) from fluid nozzle 42 towards blade 12. Fluid 26 can enter scoop inlet 28 and flow radially past barrier 22. Centrifugal force may then direct fluid 26 outward, in a direction away from central axis 14, to Inner surface of capture arc 68 and thus within capture cavity 74, wherein barrier 22 can prevent fluid 26 from flowing back towards scoop inlet 28. Fluid 26 may then be directed into one or more conduits 38 located proximate to a scoop outlet 32, which are positioned to provide fluid communication between scoop 10 and bearing 40, or to other components (not shown) requiring lubrication, cooling, or the like.

Accordingly, in an embodiment, the present invention includes a method 200 of providing a fluid to a bearing, comprising a step 202 of rotating a rotor shaft 36 supported by a bearing assembly 40, wherein scoop 10 circumscribes rotor shaft 36. In a further step 204, fluid 26 may be directed, e.g., sprayed, towards scoop 10 such that at least a portion of fluid 26 may be received by scoop 10. Thereafter, in step 206 fluid received by scoop 10 may be distributed to bearing assembly 40 through conduit 38 disposed between scoop 10 and bearing assembly 40, which may provide fluid communication between scoop 10 and bearing assembly 40. In an embodiment, method 200 may further comprise a step 208 of rejecting, or failing to capture, a portion of the fluid, representing inefficiency of the process. Fluid 26 may be sprayed at scoop 10 from fluid nozzle 42 positioned to direct fluid 26 towards scoop 10 at a spray angle 76 between about 90° and about 10°, relative to a line T tangent to outer radius 16. In an embodiment, spray angle 76 may be between about 70° and about 20°. The method may also include a step 210 of lubricating bearing assembly 40, rotor shaft 36, as well as other components requiring lubrication, wherein fluid 26 may be lubrication oil. The method may also include a step 212 of cooling bearing assembly 40, rotor shaft 36, as well as other components requiring cooling. As can be appreciated by those skilled in the art, the present invention provides a scoop, which maximizes fluid capture. By providing a scoop comprising a curved blade, the kinetic energy loss of the fluid may be minimized. Thus, the need for increased fluid flow to overcome scoop inefficiency may be reduced or eliminated by the present invention.

It should be understood, of course, that the foregoing relates to exemplary embodiments of the invention and that modifications may be made without departing from the spirit and scope of the invention as set forth in the following claims.

We claim:
1. A scoop, comprising:
    a blade at least partially circumscribing a central axis of said scoop from an outer radius of said scoop to a capture radius of said scoop; and
    a barrier located at a downstream end of said blade;
    wherein said blade is curved, and has a blade inner surface curvature from said outer radius to said barrier, the blade inner surface curvature varying from said outer radius to said barrier.

2. The scoop of claim 1, wherein said blade has an inner surface that is curved from said outer radius to said capture radius.

3. The scoop of claim 1, wherein said barrier depends radially inward from said blade towards said central axis to define a capture radius.

4. The scoop of claim 1, wherein said blade inner surface curvature between said outer radius and said barrier is different from a radius of curvature of said capture radius.

5. The scoop of claim 1, wherein said blade inner surface curvature varies uniformly from said outer radius to said barrier.

6. The scoop of claim 1, wherein said blade inner surface curvature varies non-uniformly from said outer radius to said barrier.

7. The scoop of claim 1, wherein said blade inner surface curvature varies continuously from said outer radius to said barrier.

8. The scoop of claim 1, wherein said blade inner surface curvature varies non-continuously from said outer radius to said barrier.

9. The scoop of claim 1, wherein said blade inner surface curvature varies eccentrically from said outer radius to said barrier.

10. The scoop of claim 1, wherein said blade inner surface curvature varies exponentially from said outer radius to said barrier.

11. The scoop of claim 1, wherein said blade inner surface curvature varies spirally from said outer radius to said barrier.

12. The scoop of claim 1, wherein said blade inner surface curvature varies such that it forms an arc that is a best fit approximation of a logarithmic spiral segment starting from said outer radius to said barrier.

13. The scoop of claim 12, further comprising a scoop outlet located at said capture radius or a larger radius.

14. The scoop of claim 1, wherein said blade defines a scoop inlet between said blade and said capture radius at a point where said blade inner surface meets said outer radius.

15. The scoop of claim 1, wherein said blade has a width essentially parallel to said central axis.

16. The scoop of claim 1, wherein said blade has a width parallel to said central axis.

17. The scoop of claim 1, wherein said scoop comprises a single blade.

18. The scoop of claim 1, comprising a plurality of said blades, each of said blades at least partially circumscribing said central axis.

19. The scoop of claim 18, wherein each of said blades have the same blade length determined along blade inner surface from said outer radius to said capture radius.

20. The Scoop of claim 18, wherein two or more of said blades have a different blade length determined along blade inner surface from said outer radius to said capture radius.

21. A scoop comprising:
a blade having an inner surface located between a central axis and an outer radius of said scoop, said blade inner surface at least partially circumscribing said central axis of said scoop from a scoop inlet to a scoop outlet and having has a blade curvature that is at least partially spiral with respect to said central axis, said scoop inlet located at said outer radius of said scoop and said scoop outlet located at a capture radius of said scoop or a larger radius, wherein said inside surface of said blade is curved.

22. The scoop of claim 21, wherein said inner surface of said blade has a blade curvature from said outer radius to a barrier located between said scoop inlet and said scoop outlet.

23. The scoop of claim 22, wherein said barrier depends radially inward from said blade towards said central axis to a capture radius which is between said capture radius and said outer radius.

24. The scoop of claim 23, wherein said blade curvature comprises a plurality of points P on said blade inner surface between said scoop inlet and said barrier, wherein said plurality of points P are defined by the equation:

$$\frac{\text{Point } P \text{ radius}}{\text{Capture radius}} = e^{\beta \tan \alpha}$$

wherein:
α is an angle between a line tangent to said outer radius and said blade inner surface at the outer radius,
β is said angular distance of point P from said capture radius, and
e is the exponential function.

25. A scoop comprising:
a blade at least partially circumscribing a central axis from a scoop inlet located at an outer radius, to a scoop outlet located at a capture radius, wherein said blade has an inside blade surface between said central axis and said outer radius, said blade having a blade curvature from said outer radius to a barrier located between said scoop inlet and said scoop outlet, wherein said barrier depends radially inward from said blade towards said central axis to define a capture radius;
a capture cavity located circumferentially between said barrier and said scoop outlet,
said capture cavity being bounded by said capture radius and by the inner surface of a capture arc, wherein said capture arc is between said capture radius and said outer radius of said scoop, wherein said blade curvature comprises a plurality of points P on said blade circumferentially between said scoop inlet and said barrier, wherein said plurality of points P are defined by the equation:

$$\frac{\text{Point } P \text{ radius}}{\text{Capture radius}} = e^{\beta \tan \alpha}$$

wherein:
α is an angle between a line tangent to said outer radius and said blade inner surface at the outer radius,
β is said angular distance of point P from said capture radius, and
e is the exponential function.

26. A turbine engine comprising:
a rotor shaft supported by at least two bearings with or without a seal;
a fluid nozzle for ejecting a fluid towards a scoop circumscribing said rotor shaft;
wherein said scoop comprises a blade at least partially circumscribing a central axis of said rotor shaft from a first radial position an outer radius of said scoop to a second radial position at a capture radius of said scoop, wherein said blade is curved, at least partially circumscribes said central axis from a scoop inlet located at an outer radius to a scoop outlet located at a capture radius, and has an inner surface having a curvature from said outer radius to a barrier located between said scoop inlet and said scoop outlet, said barrier depending radially inward from said inside blade surface towards said central axis to a capture radius, said blade inner surface curvature comprising a plurality of points P on said blade inner side between said scoop inlet and said barrier, said plurality of points P defined by the equation:

$$\frac{\text{Point } P \text{ radius}}{\text{Capture radius}} = e^{\beta \tan \alpha}$$

wherein:
- α is an angle between a line tangent to said outer radius and said blade inner surface at the outer radius,
- β is said annular distance of point P from said capture radius, and
- e is the exponential function;

wherein said fluid nozzle is positioned to direct said fluid towards said scoop at an angle between about 90° to about 10° relative to a line T tangent to said outer radius.

27. The turbine engine of claim 26, wherein said rotor shaft comprises a conduit extending axially along said rotor shaft from said scoop outlet to said one or more of said bearings and/or one or more of said seals.

28. The turbine engine of claim 26, wherein said blade curvature is at least partially spiral with respect to said central axis from said scoop outlet to said barrier.

29. The turbine engine of claim 26, wherein said fluid nozzle is positioned to direct said fluid towards said scoop at an angle between about 70° and about 20°, relative to a line T tangent to said outer radius.

30. A method of providing a fluid to a bearing assembly comprising:
spraying said fluid towards a scoop such that at least a portion of said fluid is captured by said scoop, said scoop circumscribing a rotor shaft that is supported by a bearing assembling circumscribing said rotor shaft; and
distributing said fluid captured by said scoop to said bearing assembly through a conduit disposed in said rotor shaft or said scoop or other elements on the rotor shaft, said conduit extending axially from said scoop to said bearing assembly, said bearing assembly also in fluid communication with said scoop, wherein said scoop comprises a blade at least partially circumscribing a central axis from an outer radius to a capture radius and a barrier located at a downstream end of said blade, wherein said blade is curved and has a blade inner surface curvature from said outer radius to said barrier, the blade inner surface curvature varying from said outer radius to said barrier.

31. The method of claim 30, further comprising retaining a portion of said received fluid within a capture cavity of said scoop, wherein said barrier is located between said scoop inlet and said scoop outlet and depends radially inward from said blade towards said central axis to define a capture radius from said central axis to said barrier, said capture radius between said capture radius and said outer radius; and wherein said conduit extends axially along said rotor shaft from said scoop outlet to said at least one bearing, and wherein said capture cavity partially circumscribes said central axis between said barrier point and said scoop outlet, said capture cavity being bound by said capture radius and by said blade radially disposed at a back face radius between said capture radius and said outer radius, wherein said back face radius is less than said outer radius and greater than said capture radius.

32. The method of claim 30, wherein said spraying of said fluid towards said scoop comprises spraying said fluid from a fluid nozzle positioned to direct said fluid towards said scoop at a spray angle of from about 90° to about 10° relative to a line T tangent to said outer radius.

33. The method of claim 30, wherein said spraying is at a spray angle between about 70° and about 20° relative to a line T tangent to said outer radius.

34. The method of claim 30, wherein: said distributing said fluid received by said scoop to said bearing assembly comprises lubricating said bearing, and said fluid is a lubrication oil.

* * * * *